(12) United States Patent
Mattern

(10) Patent No.: US 8,483,653 B2
(45) Date of Patent: Jul. 9, 2013

(54) PANIC MESSAGE DELIVERY SYSTEM AND METHOD FOR MOBILE DEVICES

(76) Inventor: Jeremy Mattern, Houston, TX (US)

( * ) Notice: Subject to any disclaimer, the term of this patent is extended or adjusted under 35 U.S.C. 154(b) by 114 days.

(21) Appl. No.: 12/791,869

(22) Filed: Jun. 2, 2010

(65) Prior Publication Data

US 2011/0300824 A1    Dec. 8, 2011

(51) Int. Cl.
*H04M 11/04*    (2006.01)
(52) U.S. Cl.
USPC ............. 455/404.1; 455/414.1; 455/456.1; 455/466; 455/412.1; 455/418; 455/404.2
(58) Field of Classification Search
USPC ........... 455/414.1, 456.1, 404.1, 466, 412.1, 455/418
See application file for complete search history.

(56) References Cited

U.S. PATENT DOCUMENTS

| 2008/0200142 | A1* | 8/2008 | Abdel-Kader et al. | .... 455/404.2 |
| 2011/0039514 | A1* | 2/2011 | Patnaik et al. | ............. 455/404.2 |
| 2011/0081899 | A1* | 4/2011 | Stahulak et al. | ............. 455/418 |
| 2011/0111728 | A1* | 5/2011 | Ferguson et al. | ......... 455/404.2 |
| 2011/0195685 | A1* | 8/2011 | Bridges et al. | ............. 455/404.1 |

* cited by examiner

*Primary Examiner* — Kamran Afshar
*Assistant Examiner* — Khalid Shaheed
(74) *Attorney, Agent, or Firm* — Spradley, PLLC; Michael Spradley

(57) ABSTRACT

A system and method is disclosed for sending a panic message. Specifically, a program that monitors inputs devices runs on a mobile device. A series of inputs from the one or more input devices of a mobile device is received. The series of inputs can be computed to a unique sequence associated with a function. Then, a function is executed if the combination of inputs matches the unique sequence.

24 Claims, 3 Drawing Sheets

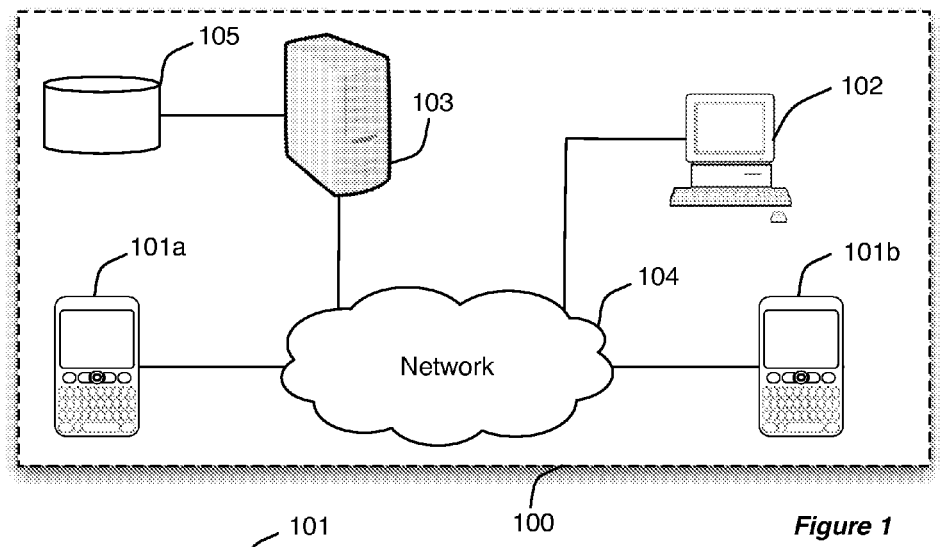
Figure 1
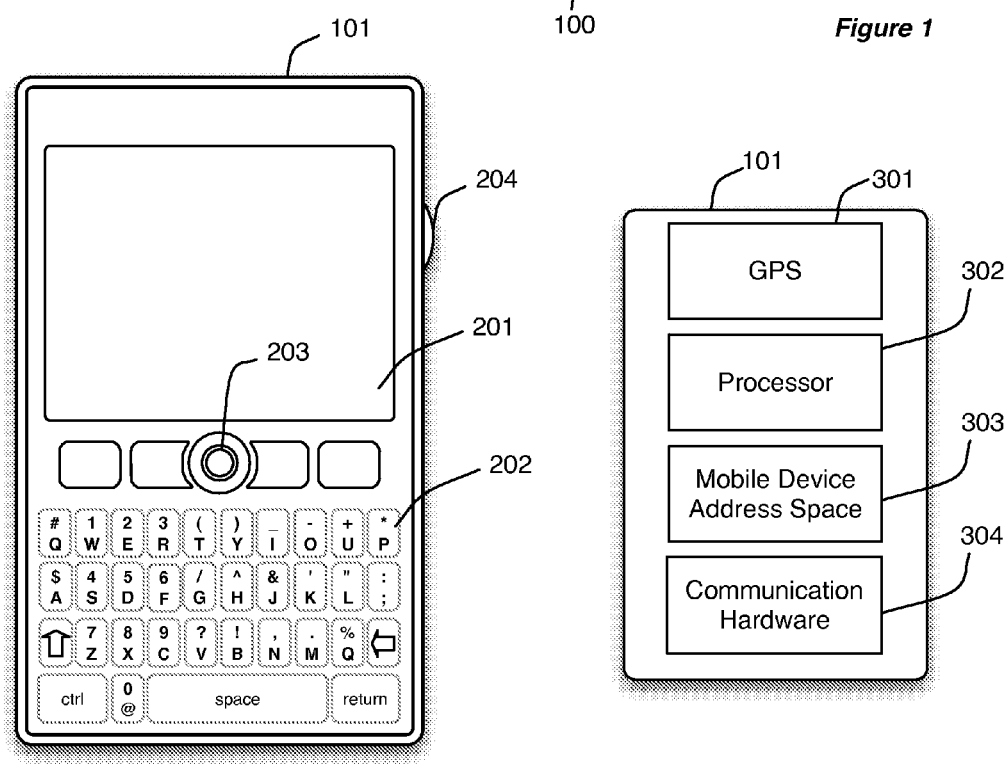
Figure 2
Figure 3

PANIC MESSAGE DELIVERY SYSTEM AND METHOD FOR MOBILE DEVICES

BACKGROUND

This disclosure relates to a panic code system for mobile devices.

In an effort to combat crime, a police officer sometimes must go "undercover", that is conceal his identity as a police officer, to obtain evidence of criminal acts. However such work is inherently dangerous, and situations may arise where an undercover officer may need to covertly signal for other officers to arrive at the scene. In doing so, the undercover officer may not want to reveal himself as an officer.

The prevalence of mobile devices such as cell phones and PDA's gives an undercover officer the ability to contact back up officers in a number of ways. However, methods such as merely dialing a phone number, sending a text or sending an email could put the identity of the undercover agent in jeopardy if the person or persons he is monitoring look at the officer's phone.

It would, therefore, be advantageous to implement a method and system for sending a covert panic message on mobile devices.

SUMMARY

A system and method is disclosed for sending a panic message. Specifically, an application that monitors inputs devices can run in the background of a mobile device. A series of inputs from the one or more input devices of a mobile device can be received. The series of inputs can be compared to a unique sequence associated with a function. Then a function can be executed if the combination of inputs matches the unique sequence.

Additionally, a mobile device is disclosed. In one embodiment, the mobile device can comprise one or more input devices, a memory that stores unique sequence, and a processor. The processor can receive input data from the one or more input devices, compare the input data to the unique sequence, and transmit a message associated with the unique sequence if at least a portion of the input data matches the unique sequence.

BRIEF DESCRIPTION OF THE DRAWINGS

FIG. 1 illustrates a communication network system.

FIG. 2 illustrates input and output hardware on a mobile device.

FIG. 3 illustrates internal hardware within a mobile device.

DETAILED DESCRIPTION

Figure 4:
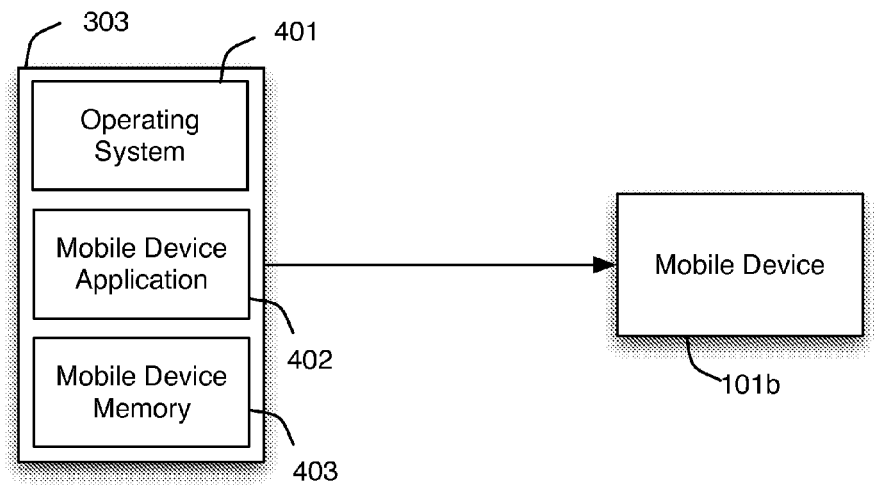
FIG. 4 illustrates data flow between mobile devices in a communication network system.

Described herein is a method and system for sending a covert panic message on mobile devices. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), numerous programming decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of database design and management having the benefit of this disclosure. Accordingly, the disclosed embodiments are not intended to limit the claims, which claims appended by the disclosed embodiments, but are to be accorded their widest scope consistent with the principles and features disclosed herein.

FIG. 1 illustrates a communication network system 100. A communication network system 100 can comprise one or more mobile devices 101, a computer 102 and a server 103 communicating over a network 104. Server 103 can connect to a storage device 105. Storage device 105 can connect directly to server 103, as shown in FIG. 1, or may exist remotely on network 104. Storage device 105 can comprise any suitable long-term or persistent storage device and, further, may be separate devices or the same device and may be collocated or distributed (interconnected via any suitable communications network). Computer 102 can include, but are not limited to, a laptop, desktop, workstation, server, mainframe and/or terminal. Network 104 can be a local area network (LAN), a wide area network (WAN), a piconet, or a combination of LANs, WANs or piconets. Network 104 can be hard-wired, wireless, or a combination of both. One illustrative LAN is a network within a single business. One illustrative WAN is the Internet.

FIG. 2 illustrates input and output devices on mobile device 101. Mobile device 101 can include, but is not limited to, a screen 201, buttons 202, a trackball 203, and/or a scroll wheel 204. Screen 201 can be a mere display output, or may also be a touch screen, allowing for capture of input data. Buttons 202 can include a numeric keypad, a QWERTY keyboard, and/or on/off buttons. Such list is exemplary and not exhaustive. In one embodiment, buttons are physical devices. In another embodiment, where screen 201 is a touch screen, buttons 202 can be represented virtually on screen 201. Buttons collect input data from a user.

FIG. 3 illustrates internal hardware within mobile device 101. Mobile device 101 can comprise a global positioning system (GPS) 301. GPS 301 can also collect input data, in the form of positioning data. Such input data comprises positioning data. Input data from the input devices mentioned above is sent to a processor 302. Processor 302 can perform processes on the data according programs stored in mobile device address space 303, as discussed further below. Processes can include storing input data to mobile device memory 303, verifying input data conforms to preset standards or ensuring all required data has been gathered for an operation to be complete. Data can be sent to communication hardware 304 for communication over network 104. Communication hardware 304 can include a network transport processor for packetizing data, communication ports for wired communication or an antenna for wireless communication. Communication hardware 304 can communicate using a variety of protocols. Examples of protocols include internet communication protocols such as transmission control protocol (TCP), internet protocol (IP), IPv6 high speed downlink packet access (HSPDA), telecom protocols such as code division multimedia access (CDMA), global system for mobile (GSM) and code division multiple access (CDMA), and message protocols such as multimedia messaging service (MMS), and short message service (SMS). Such list is exemplary and not exhaustive.

FIG. 4 illustrates data flow between mobile devices in a communication network system. Mobile device address space 303 can comprise one or more programs such as an operating system 401 and/or an application 402. An operating system 401 acts as an interface between a user of mobile device 101 and hardware within mobile device 101, and can host application 402 running on mobile device 101. Examples of operating system 401 include Android, iPhone OS, and BlackBerry OS. In one embodiment, application is initiated automatically at startup of mobile device 101. In another embodiment, user opens application 402 after startup. Application 402 can run in the background. In one embodiment, there is no application 402. In such embodiment, the abilities of application 402 described herein this application can be performed by operating system 401.

Application 402 can monitor user input from input devices mentioned above. Application 402 can comprise various functions that are accessible by entering a unique sequence of input data with input devices. In one embodiment, the unique sequence can be an alphanumeric sequence typed using buttons 202. In another embodiment, the unique sequence can be a sequence of movements on a touch screen. In another embodiment, the unique sequence is a sequence of inputs from different input devices. Application 402 can include a utility function accessible by a first unique sequence. Application 402 can also include a panic function accessible by a second unique sequence. Application 402 can include a plurality of panic functions. Utility function can bring application 402 into the foreground. Once application 402 is in the foreground, the user can perform various tasks that can include setting unique sequences, defining a panic transmission protocol priority (i.e., first SMS, second GSM, etc. . . . ), defining panic transmission attempt limits, defining a panic message or messages, inclusion or exclusion of GPS input data in the panic message (such as last known location), defining a panic message destination or destinations, and/or defining panic message destination priority. Unique sequences, panic transmission protocol priority, panic transmission attempt limits, panic messages, GPS input data inclusion/exclusion setting, panic message destination and panic message destination priority can each be stored in a mobile device memory 403. Panic message can be associated with a particular communication protocol. Upon entering the unique sequence associated with a particular panic function, the panic function can deliver panic message to panic message destination. As shown in FIG. 4, panic message destination can be mobile device 101b.

Figure 5:
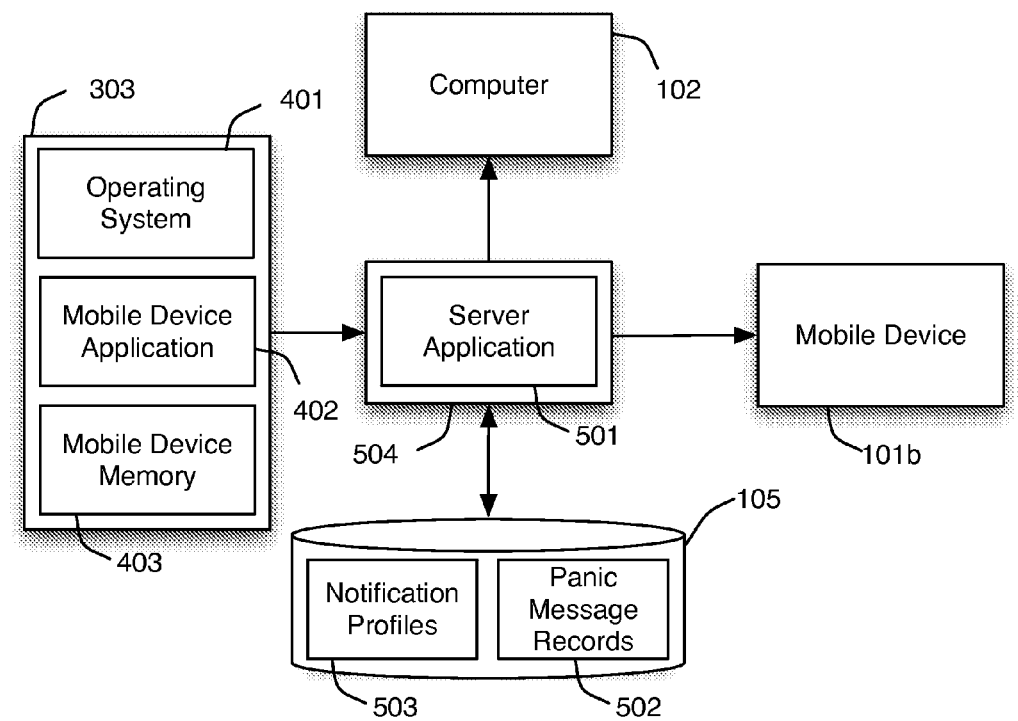
FIG. 5 illustrates data flow between mobile device address space and a server address space in a communication network system.

FIG. 5 illustrates data flow between mobile device address space 303 and server address space 504 in a communication network system. In another embodiment, panic sequence can deliver message to server 103. Server 103 can comprise a server application 501. After server 103 receives panic message, server application can create a panic message record 502 and can store panic message record 502 in storage device 105. In one embodiment, server application 501 can relay the panic message to computer 102 and/or mobile device 101b. In another embodiment, the panic message can be merely a machine-readable instruction to initiate a notification system on server 103. Such notification system can transmit a human readable panic message to be distributed by the notification system. Panic message can be distributed in many forms. Examples in form include text message, multimedia message, phone call and/or email. In another embodiment, server application 501 can allow the user or a second user to define a relay panic transmission protocol priority, relay panic transmission attempt limits, relay panic messages, a relay panic message destination and/or a relay panic message destination priority in a notification profile 503. In one embodiment, notification profiles 503 can be stored in storage space 105. Further, in one embodiment, mobile device 101a can be associated with a notification profile 503. Further, in one embodiment, notification profile can be associated with a unique mobile device 101a. In another embodiment, notification profile 503 can be associated with a plurality of mobile devices 101a.

Figure 6:
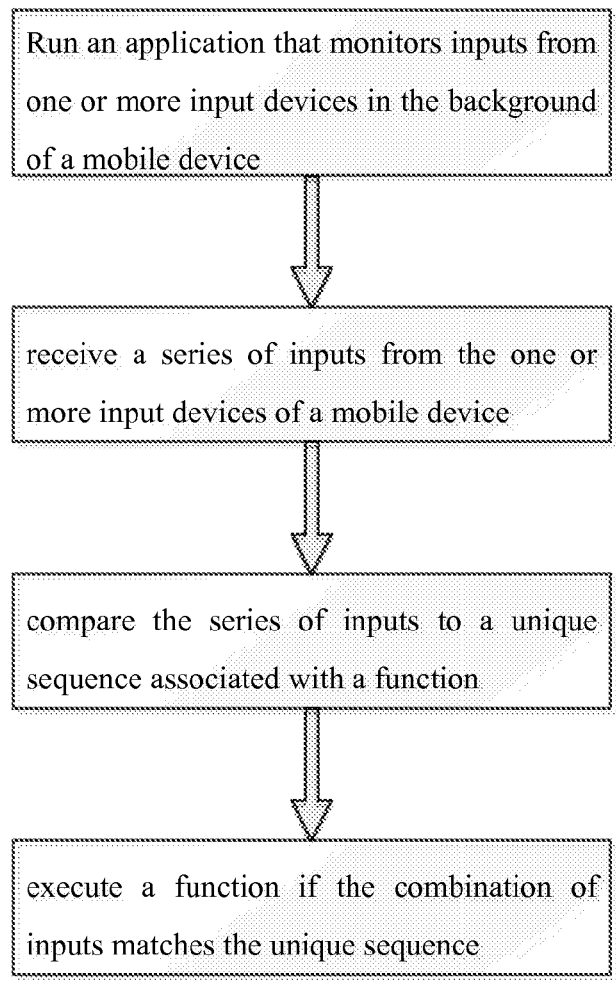
FIG. 6 illustrates an exemplary method of sending a panic message.

FIG. 6 illustrates an exemplary method of sending a panic message. Specifically, an application that monitors inputs devices runs in the background of a mobile device. A series of inputs from the one or more input devices of a mobile device is received. The series of inputs is then compared to a unique sequence associated with a function. Then a function is executed if the combination of inputs matches the unique sequence. Such function can be a utility function or a panic function.

Various changes in the details of the illustrated operational methods are possible without departing from the scope of the following claims. Some embodiments may combine the activities described herein as being separate steps. Similarly, one or more of the described steps may be omitted, depending upon the specific operational environment in which the method is being implemented. In addition, acts in accordance with the figures may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes called computer readable storage medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:
1. A method of sending a panic message, comprising:
running on a mobile device a program that monitors inputs multiple input devices;
receiving a series of inputs from said multiple input devices of a mobile device;
comparing said series of inputs to a first unique sequence and a second unique sequence, wherein said first unique sequence accesses a first function and said second sequence accesses a second function;

executing said first function if said first series of inputs matches said first unique sequence; said first function causing a panic message to be sent according to a panic transmission protocol priority, and a predefined panic message destination.

2. A method of sending a panic message, comprising:
running on a mobile device a program that monitors inputs from one or more input devices, wherein the program is an operating system;
receiving a series of inputs from the one or more input devices of a mobile device;
comparing the series of inputs to a unique sequence associated with a function; and
executing a function if the combination of inputs matches the unique sequence.

3. The method of claim 1 wherein the function is a panic function.

4. The method of claim 3 wherein executing the panic function comprises sending a panic message associated with the panic function.

5. The method of claim 4 comprising the step receiving global positioning system (GPS) data from a GPS receiver.

6. The method of claim 5 wherein the panic message comprises GPS data.

7. The method of claim 4 wherein the panic message is sent via email.

8. The method of claim 4 wherein the panic message is sent via text message.

9. The method of claim 4 wherein the panic message is sent via voice message.

10. The method of claim 4 wherein the panic message is user defined.

11. The method of claim 4 wherein the panic message is sent in data packets.

12. The method of claim 1 wherein the function is a utility function.

13. The method of claim 1 wherein the one or more input devices comprises a keyboard.

14. The method of claim 1 wherein the one or more input devices comprises a touch screen.

15. The method of claim 1 wherein the one or more input devices comprises a scroll wheel.

16. The method of claim 1 wherein the one or more input devices comprises a track ball.

17. The method of claim 1 wherein the unique sequence is user defined.

18. The method of claim 1 wherein executing the function causes a notification system running on a server to send a panic message to one or more devices.

19. The method of claim 18 wherein the one or more devices is a mobile device.

20. The method of claim 18 wherein the one or more devices is a computer.

21. A mobile device comprising:
multiple input devices
a memory that stores a first unique sequence and a second unique sequence; and
a processor that
runs a program that monitors inputs from multiple input devices;
receiving a series of inputs from said multiple input devices of a mobile device;
compares said series of inputs to said first unique sequence and said second unique sequence, wherein said first unique sequence accesses a first function and said second sequence accesses a second function; and
executes said first function if said series of inputs matches said first unique sequence;
said first function causing a panic message to be sent according to a panic transmission protocol priority and a predefined panic message destination.

22. The mobile device of claim 21 further comprising a GPS receiver that receives GPS data and transmits the GPS data to the processor.

23. The mobile device of claim 22 wherein the message comprises the GPS data.

24. A non-transitory computer usable readable storage medium having a computer readable program code embodied therein, wherein the computer readable program code is adapted to be executed to implement the method performed by claim 1.

* * * * *